United States Patent [19]

Smith

[11] 4,015,856
[45] Apr. 5, 1977

[54] STABILIZER MECHANISM

[76] Inventor: William Van Smith, 1617 Duke St., Memphis, Tenn. 38108

[22] Filed: Oct. 7, 1975

[21] Appl. No.: 620,508

[52] U.S. Cl. .......................... 280/446 B; 280/457
[51] Int. Cl.² ........................................ B62D 53/00
[58] Field of Search ....... 280/446 R, 446 B, 456 R, 280/460 R, 461 R, 457

[56] References Cited

UNITED STATES PATENTS

| | | | |
|---|---|---|---|
| 2,612,382 | 9/1952 | Landis | 280/446 B |
| 3,362,727 | 1/1968 | Malherbe | 280/446 B |
| 3,379,456 | 4/1968 | Bogie | 280/446 B |
| 3,722,920 | 3/1973 | Reese | 280/446 B |

Primary Examiner—Robert R. Song
Assistant Examiner—R. Schrecengost
Attorney, Agent, or Firm—Watson, Cole, Grindle & Watson

[57] ABSTRACT

A stabilizer mechanism for controlling swaying of a towed vehicle with respect to the corresponding towing vehicle. A first section of a cable is coupled to one lateral side of a rear end of a towing vehicle and is coupled to a force transferring mechanism mounted on the towed vehicle. A second section of the cable passes from the force transferring mechanism and is coupled to the opposite lateral side of the rear end of the towing vehicle. In this manner the cable effectively transfers a force indicative of the relative angular movement between the towing vehicle and the towed vehicle to the force transferring mechanism. A force absorbing mechanism is coupled to receive an output force from the force transferring mechanism and serves to dampen sudden forces applied to the force transferring mechanism.

5 Claims, 3 Drawing Figures

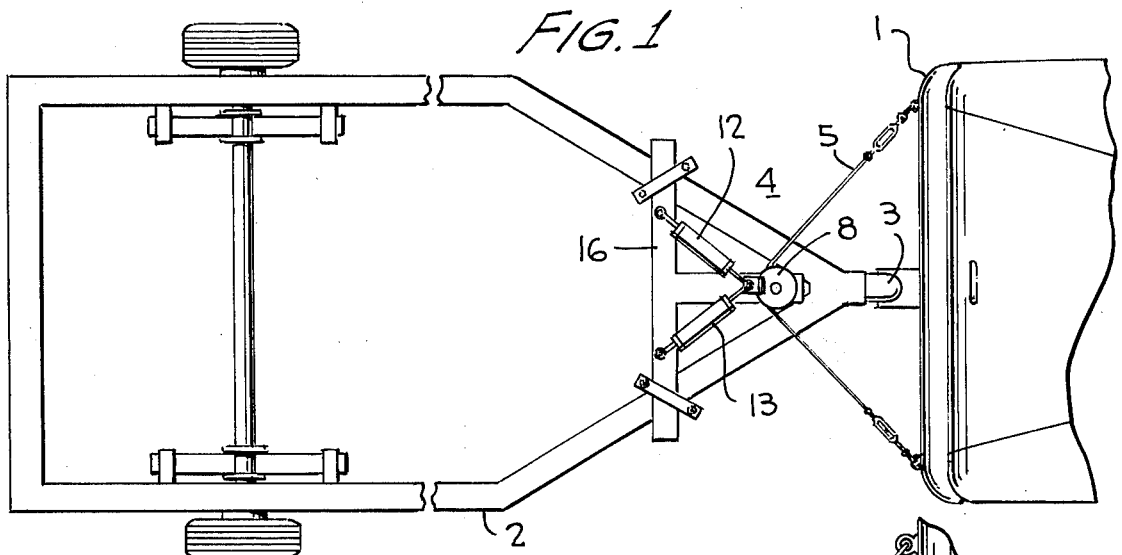
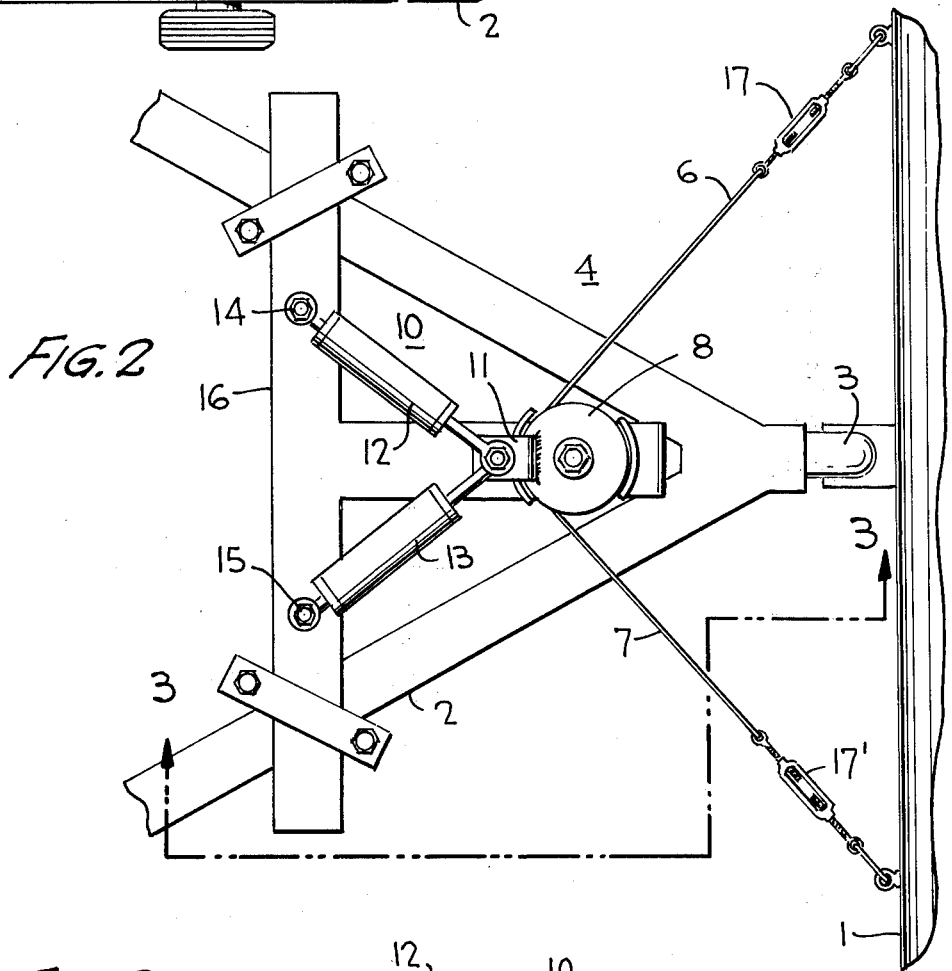
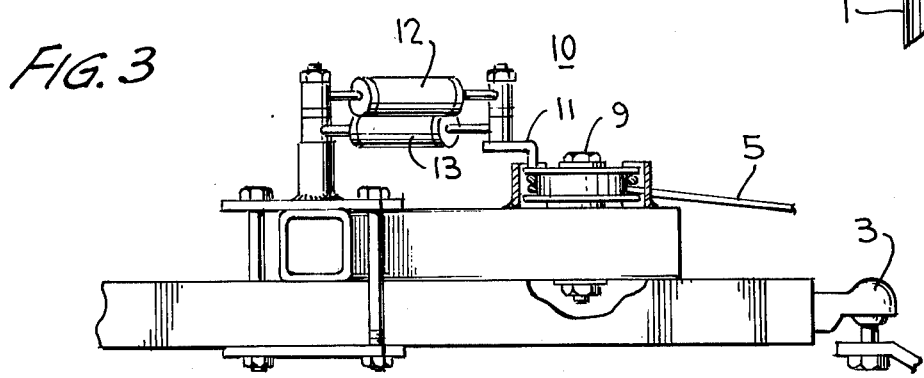

STABILIZER MECHANISM

BACKGROUND OF THE INVENTION

The present invention relates to a stabilizer mechanism to be attached to a towed vehicle and coupled with the respective towing vehicle so as to control any swaying movement of the towed vehicle.

Several previous mechanisms are known for providing such sway control between a towing and towed vehicle. Representative of such previously known devices are those illustrated by the United States patents to: Bogie, U.S. Pat. No. 3,338,595; Gearhart, U.S. Pat. No. 3,394,949; Rendessy, U.S. Pat. No. 3,659,874; and, Herbert, U.S. Pat. No. 3,722,919. In several of these devices, a sway control mechanism is provided in the coupling between a towing and towed vehicle, such as in the patents to Bogie and Rendessy. In these mechanisms, a cable is attached to one end of the towing vehicle, the cable then passes back to the towed vehicle and is wrapped around a friction control drum. The same cable then continues back along the frame of the towed vehicle and is again coupled to the towing vehicle at the opposite side of the rear end of the towed vehicle. In controlling the swaying action of the towed vehicle, such devices depend on the friction which is generated within the friction drum around which the cable is wrapped.

Such previously know stabilizer mechanisms which depend upon a friction member for controlling swaying movement, however, are subject to a significant amount of wear and hence have a relatively short life span. Consequently, these friction control members have to be replaced relatively often; otherwise, they totally lose their effectiveness.

Other types of mechanisms are also known for guiding the movement of a towed vehicle. One such mechanism is illustrated by the patent to Barchus, No. 3,883,151. In this patent, a shock absorber mechanism is attached along the front axle of the towed vehicle for controlling the vehicle camber and toe-in so as to facilitate vehicle guidance regardless of the direction of movement of the towed vehicle. Such an arrangement, however, is neither utilized nor would serve the function of controlling swaying movement of the towed vehicle.

One of the primary reasons for providing such sway control mechanisms is to prevent a fishtailing effect from occurring upon the transmission of sudden forces to the towed vehicle. Consequently, all such stabilizers or sway control mechanisms help to absorb the forces which are applied to the towed vehicle so as to substantially eliminate any fishtailing effects.

SUMMARY OF THE INVENTION

An object of the present invention is to provide an improved stabilizer mechanism to be coupled between a towing vehicle and a towed vehicle for controlling swaying movement of the towed vehicle.

Another object of the present invention is to provide a stabilizer mechanism which will more effectively control swaying movement and substantially eliminate fishtailing effects of a towed vehicle.

A further object of the present invention is to provide a stabilizer mechanism which is subject to less wear and thus has an increased longevity as compared to previously known systems.

In order to accomplish these objectives, a stabilizer mechanism, in accordance with the present invention, is coupled between a towing vehicle and a towed vehicle for controlling swaying movement of such towed vehicle, which mechanism provides an improved operation without being as highly subjected to wear as previously known mechanisms.

This stabilizer mechanism is mounted on the towed vehicle and includes a force transferring member which is coupled by a cable to the towing vehicle. A first section of the cable is coupled to one lateral side of the rear end of a towing vehicle and is subsequently coupled to the force transferring member. A second section of the cable is coupled from the force transferring member to the opposite lateral side of the rear end of the towing vehicle. In this manner, the cable is capable of transferring a force indicative of relative angular movement between the towing vehicle and the towed vehicle to the force transferring member. The force transferring member in turn provides an output force in response to the force received by the cable. This output force is coupled to a force absorbing member. The force absorbing member serves to dampen any force applied to the force transferring member and also helps to significantly eliminate the effects of any sudden forces, such as forces which would cause fishtailing of the towed vehicle.

The force transferring member includes a pulley which is mounted so as to be rotated in dependence upon movement of the cable. At least one and preferably two shock absorbers are coupled to the pulley and serves to dampen the force created by movement of the pulley. Each of the shock absorbers has one end eccentrically coupled to the pulley and its other end pivotably mounted to a rigid bar connected to the frame of the towed vehicle.

BRIEF DESCRIPTION OF THE DRAWINGS

FIG. 1 is a plan view of a towing vehicle and a coupled towed vehicle with its body removed for the sake of clarity, along with a stabilizer mechanism according to the present invention coupled between the towing vehicle and the towed vehicle.

FIG. 2 is an enlarged view of a portion of the stabilizer mechanism according to the present invention.

FIG. 3 is a sectional view taken along lines 3—3 in FIG. 2.

DESCRIPTION OF THE PREFERRED EMBODIMENT

As shown in FIG. 1, a towing vehicle 1, such as an automobile, has a towed vehicle 2, such as a trailer, attached to it by a ball-joint coupling mechanism 3. Stabilizer or sway control mechanism 4 is mounted on the frame of towed vehicle 2.

Stabilizer mechanism 4 includes a pulley 8 and shock absorbing mechanism 10. A cable 5 has a first section 6 coupled at one rear end of towing vehicle 1 via a turn buckle 17 and pulley 8. After cable section 6 has been wrapped around pulley 8 one turn, a second section 7 of the cable is coupled to the opposite lateral side of the rear end of towing vehicle 1 via another turn buckle 17'. In this manner, as towed vehicle 2 sways in one direction with respect to towing vehicle 1, pulley 8 will be forced to rotate in a first direction due to the influence of the force transmitted by cable sections 6 and 7. On the other hand, as towed vehicle 2 sways in the opposite direction, pulley 8 will be forced to rotate in the opposite direction, again due to the influence of cable sections 6 and 7.

Shock absorbing mechanism 10 is eccentrically coupled to pulley 8 by a coupling arm 11. Shock absorbing mechanism 10 includes two shock absorbers 12 and 13, each having one end pivotally coupled to arm 11 and its other end pivotally coupled to bar 16 at points 14 and 15, respectively. Bar 16 in turn is connected to the frame of towed vehicle 2. Thus as pulley 8 is rotated, the shock absorbers pivot about points 14 and 15 with each piston moving in and out of the respective cylinder. The movement of each shock absorber is dependent upon both the direction and extend of movement of pulley 8. Shock absorbing mechanism 10 thereby serves to dampen the force created by the relative movement between towed vehicle 2 and towing vehicle 1, with such force being transmitted to the shock absorbing mechanism via cable 5 transferring force to pulley 8.

The piston and cylinder arrangement of shock absorbing mechanism 10 can be formed by a typical automobile shock absorber modified to operate in the horizontal direction. While stabilizer mechanism 4 is illustrated as being located in the front portion of the towed vehicle, since effective control can be obtained while minimizing the length of the cable with such an arrangement, it is noted that it is alternatively possible to arrange stabilizer mechanism 4 behind the axle of a towed vehicle.

It is noted that the above description and the accompanying drawings are provided merely to present an exemplary embodiment of the present invention and that additional modifications of this embodiment are possible within the scope of this invention without deviating from the spirit thereof.

I claim:

1. A stabilizer mechanism adapted to be coupled between a towing vehicle and a towed vehicle for controlling swaying movement of such towed vehicle, the mechanism comprising:

force transferring means;
a cable having a first section adapted to be coupled to one lateral side of a rear end of a towing vehicle and subsequently being coupled to said force transferring means and a second section adapted to be coupled from said force transferring means to an opposite lateral side of the rear end of the same towing vehicle, whereby said cable sections are capable of transferring a force indicative of relative movement between a respective towing vehicle and towed vehicle to said force transferring means;
said force transferring means providing an output force corresponding to the force received from said cable;
force absorbing means coupled to receive the force from said force transferring means, said force absorbing means including at least one shock absorber having one end coupled to said force transferring means and its other end adapted to be pivotally coupled to a frame portion of a respective towed vehicle, said shock absorber serving to dampen forces applied to said force transferring means.

2. A mechanism as defined in claim 1, wherein said force transferring means is a pulley mounted on an axle for rotation and said cable section is wrapped around said pulley so as to be able to cause said pulley to rotate in either direction.

3. A mechanism as defined in claim 2 wherein said force absorbing means has two shock absorbers, each having one end eccentrically coupled to said pulley and its other end coupled to a frame portion of a respective towed vehicle.

4. A towed vehicle comprising:
a frame;
at least one wheel axle mounted on said frame; and,
a stabilizer mechanism as defined in claim 1.

5. A towed vehicle as defined in claim 4, wherein said stabilizer mechanism is arranged between said wheel axle and the front of said towed vehicle.

* * * * *